United States Patent
Saito et al.

(10) Patent No.: US 11,704,485 B2
(45) Date of Patent: Jul. 18, 2023

(54) PHRASE VECTOR LEARNING DEVICE, METHOD, AND PROGRAM

(71) Applicant: NIPPON TELEGRAPH AND TELEPHONE CORPORATION, Tokyo (JP)

(72) Inventors: Itsumi Saito, Tokyo (JP); Kyosuke Nishida, Tokyo (JP); Hisako Asano, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 336 days.

(21) Appl. No.: 16/970,326

(22) PCT Filed: Feb. 15, 2019

(86) PCT No.: PCT/JP2019/005621
§ 371 (c)(1),
(2) Date: Aug. 14, 2020

(87) PCT Pub. No.: WO2019/160097
PCT Pub. Date: Aug. 22, 2019

(65) Prior Publication Data
US 2021/0064966 A1    Mar. 4, 2021

(30) Foreign Application Priority Data
Feb. 16, 2018   (JP) ................. 2018-026515

(51) Int. Cl.
*G10L 15/00*    (2013.01)
*G06F 40/20*    (2020.01)
(Continued)

(52) U.S. Cl.
CPC ............. *G06F 40/20* (2020.01); *G06N 3/045* (2023.01); *G06N 3/08* (2013.01); *G10L 15/16* (2013.01)

(58) Field of Classification Search
None
See application file for complete search history.

(56) References Cited

U.S. PATENT DOCUMENTS 9,858,923 B2 *   1/2018   Wasserblat .......... G10L 15/1815
9,966,066 B1 *   5/2018   Corfield ................ G10L 15/142
(Continued)

FOREIGN PATENT DOCUMENTS

JP    2017-27526    2/2017

OTHER PUBLICATIONS

Mikolov, Tomas, et al., "Distributed Representations of Words and Phrases and their Compositionality," ARxIV:1310.4546V1, Oct. 16, 2013, pp. 1-9.

(Continued)

*Primary Examiner* — Satwant K Singh (57) ABSTRACT

An appropriate vector of any phrase can be generated. A lattice construction unit 212 constructs a lattice structure formed by links binding adjacent word or phrase candidates based on a morphological analysis result and a dependency analysis result of input text. A first learning unit 213 performs learning of a neural network A for estimating nearby word or phrase candidates from word or phrase candidates based on the lattice structure. A vector generation unit 214 acquires a vector of each of the word or phrase candidates from the neural network A and sets the vector as learning data. A second learning unit performs learning of a neural network B for vectorizing the word or phrase candidates based on the learning data.

17 Claims, 10 Drawing Sheets

(51) Int. Cl.
  *G06N 3/08* (2023.01)
  *G10L 15/16* (2006.01)
  *G06N 3/045* (2023.01)

(56) References Cited

U.S. PATENT DOCUMENTS

2018/0366112 A1* 12/2018 Aleksic .................. G10L 15/22
2019/0228069 A1*  7/2019 Zhou .................. G06F 16/3329

OTHER PUBLICATIONS

Mori, Junichiro, et al., "Network Embidding Understanding and Predicting Quoted Networks," IPSJ SIG Technical Report, vol. 2016-ICS-182 No. 3, Mar. 2, 2016.

Iro, Ryo, et al., "Construction of Special Polarity Dictionary for Finance by Network Expression Learning," The 31st Annual Conference of the Japanese Society for Artificial Intelligence, Mar. 10, 2017, 2D 3-0S-19 a-4.

Mizuguchi, Gai, et al., "Vector Representation Learning of Phrases Using LSTM," The 31st Annual Conference of the Japanese Society for Artificial Intelligence, May 26, 2017 4A2-2.

* cited by examiner

Fig. 2

TOTEMO ATSUKUTE KŪRĀ O TSUKEMASHITA
(AIR CONDITIONER WAS TURNED ON BECAUSE (IT WAS) SO HOT)

\* 0 1D 0/0 0.835145
TOTEMO (SO):  ADVERB-PARTICLE CONJUNCTION, *, *, *, *, TOTEMO, *TOTEMO, TOTEMO*
\* 1 3D 0/1 -1.558041
ATSUKU (HOT):  ADJECTIVE-MAIN, *, *, ADJ-GROUP-A-O-U, CONJUNCTIVE-TE-CONNECTION, ATSUI, *ATSUKU, ATSUKU*
TE (BECAUSE):  PARTICLE-CONJUNCTIVE, *, *, *, *, TE, *TE, TE*
\* 2 3D 0/1 -1.558041
KŪRĀ (AIR CONDITIONER):  NOUN-COMMON, *, *, *, *, KŪRĀ, *KŪRĀ, KŪRĀ*
*O: PARTICLE-CASE-MISC, *, *, *, O, O, O*
\* 3 -1D 0/2 0.000000
TSUKE (TURN ON):  VERB-MAIN, *, *, 1-ROW, CONJUNCTIVE, TSUKERU, *TSUKE, TSUKE*
MASHI (WAS):  AUXILIARY VERB, *, *, *, SPECIAL-MASU, CONJUNCTIVE, MASHI, *MASHI, MASHI*
TA (-ED):  AUXILIARY VERB, *, *, *, SPECIAL-TA, BASE, TA, *TA, TA*
EOS

TOTEMO ATSUI (SO HOT), [0.01, 0.02,...0.8]

KŪRĀ O TSUKERU (TURN ON AIR CONDITIONER), [0.4, 0.7,...0.2]

PHRASE VECTOR LEARNING DEVICE, METHOD, AND PROGRAM

CROSS-REFERENCE TO RELATED APPLICATIONS

This application is a U.S. 371 Application of International Patent Application No. PCT/JP2019/005621, filed on 15 Feb. 2019, which application claims priority to and the benefit of JP Application No. 2018-026515, filed on 16 Feb. 2018, the disclosures of which are hereby incorporated herein by reference in their entireties.

TECHNICAL FIELD

The present invention relates to a phrase vector learning device, method, and program.

BACKGROUND ART

A "phrase" is defined as text formed by a plurality of (one or more) words. When a phrase is vectorized, the following two methods are considered.

(Method 1) A word vector generated with word2vec or the like is used. An average of word vectors of words included in a processing target phrase is calculated and set as a phrase vector.

For example, v (totemo atsui (so hot))=v (totemo)+v (atsui). Here, v(w) is a word vector of a word w.

(Method 2) When a word vector is generated, a corpus used as an input is partitioned into words and the words are then connected according to a predetermined rule to generate a phrase (perform phrasing). A phrase is considered as words using skipgram of Non-Patent Literature 1 or the like to generate a vector.

(Normal input example): Tokyo/to/no/iin/kai/ni/syusseki/shi/ta (Attended in committee meeting of Tokyo Prefecture)

(Phrased input example): Tokyo to/no/iinkai/ni/syusseki/shi/ta

CITATION LIST

Non-Patent Literature

Non-Patent Literature 1: Tomas Mikolov, etc., "Distributed Representations of Words and Phrases and their Compositionality", arXiv: 1310. 4546v1, 16 Oct. 2013.

SUMMARY OF THE INVENTION

Technical Problem

When a method of using an average of word vectors as in Method 1 of the related art is used, there is a problem in that phrases in which words are similar tend to be similar. For example, a vector "kafun ga tobu (Pollen flies)" tends to be similar to a vector "sora o tobu (Fly in the air)."

In Method 2 of the related art, a phrase that appears in a corpus used to generate a vector can be vectorized, but there is a problem in that a phrase that does not appear in the corpus cannot be vectorized.

The present invention has been made to solve the foregoing problems and an object of the present invention is to provide a phrase vector learning device, method, and program capable of estimating nearby word or phrase candidates.

Means for Solving the Problem

To achieve the foregoing object, according to the present invention, there is provided a phrase vector learning device including: a lattice construction unit configured to construct a lattice structure formed by links binding adjacent word or phrase candidates in a sequence of lines of word or phrase candidates based on a morphological analysis result and a dependency analysis result of input text; and a first learning unit configured to perform learning of a neural network A for estimating nearby word or phrase candidates from the word or phrase candidates based on the lattice structure.

According to the present invention, there is provided a phrase vector learning method including: constructing, by a lattice construction unit, a lattice structure formed by links binding adjacent word or phrase candidates in a sequence of lines of word or phrase candidates based on a morphological analysis result and a dependency analysis result of input text; and performing, by a first learning unit, learning of a neural network A for estimating nearby word or phrase candidates from the word or phrase candidates based on the lattice structure.

According to the present invention, there is provided a program causing a computer to function as each unit included in the phrase vector learning device according to the foregoing inventions.

Effects of the Invention

According to the phrase vector learning device, method, and program of the present invention, by performing learning of a neural network A for estimating nearby word or phrase candidates based on a lattice structure formed by links binding adjacent word or phrase candidates, it is possible to obtain an effect in which the nearby word or phrase candidates can be estimated.

By acquiring a vector of each of the word or phrase candidates from the neural network A and performing learning of a neural network B for vectorizing the words or phrase candidates using the vector as learning data, it is possible to obtain an effect in which an appropriate vector can be generated for any phrase.

DESCRIPTION OF EMBODIMENTS

Hereinafter, an embodiment of the present invention will be described in detail with reference to the drawings.

<Overview of Embodiment of the Invention>

An embodiment relates to vectorization of text. As a scheme of vectorizing words, there is word2vec or the like. A method of estimating a vector space so that words of near positions t−1, t−2, t+1, t+2, . . . are predicted from a word at position t is known (Reference Literature 1). In this method, by projecting words to a fixed dimension vector representation, it is possible to calculate similarity in a continuous space.

Example: Tēburu (Table)→[0, 01, −0.02, . . . , 0.52]

Example: Isu (Chair)→[0.02, −0.04, . . . , 0.31]

[Reference Literature 1]

Tomas Mikolov, "Efficient Estimation of Word Representations in Vector Space", arXiv: 1301. 3781v3 [cs.CL], 7 Sep. 2013.

In the embodiment, dependency analysis is first performed on a sentence in advance using a dependency analyzer and a lattice structure including a plurality of possible phrased candidates is structured from a dependency result. Then, a vector representation of words or phrases is estimated in consideration of all the phrased candidates in the foregoing lattice structure.

Then, a neural network model in which the words or phrases are vectorized so that the vector representation of requested words or phrases is reproduced is learned.

<Configuration of Phrase Vector Learning Device According to Embodiment of the Present Invention>

Figure 1:
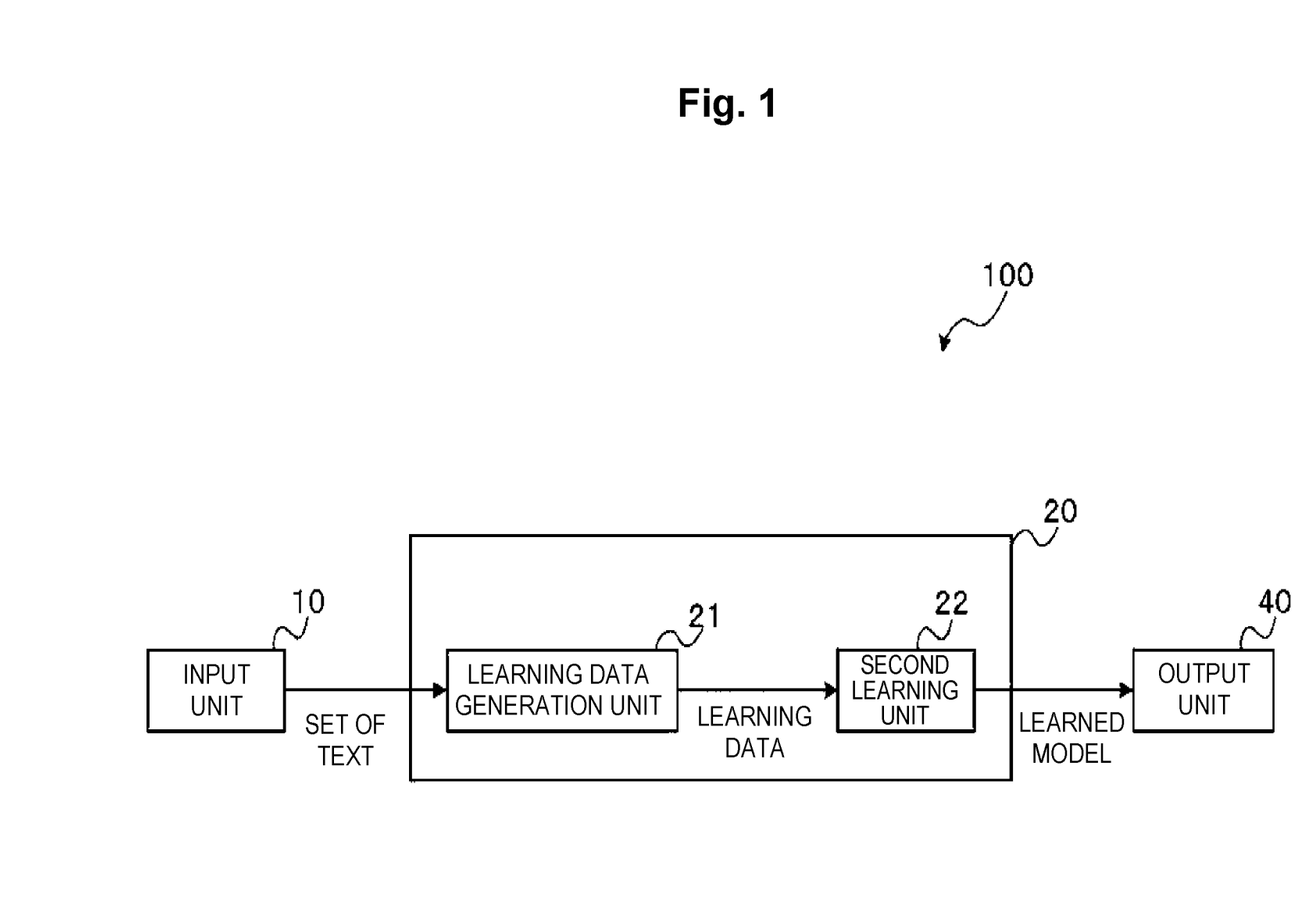
FIG. 1 is a block diagram illustrating a configuration of a phrase vector learning device according to an embodiment of the present invention.

Next, a configuration of a phrase vector learning device according to the embodiment of the present invention will be described. As illustrated in FIG. 1, a phrase vector learning device 100 according to the embodiment of the present invention can be configured as a computer including a CPU, a RAM, and a ROM that stores a program executing a learning data generation process routine and a phrase vector learning process routine to be described below and various kinds of data. The phrase vector learning device 100 functionally includes an input unit 10, an arithmetic unit 20, and an output unit 40, as illustrated in FIG. 1.

Figure 2:
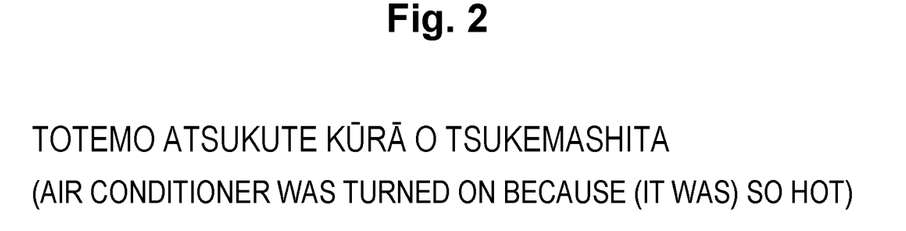
FIG. 2 is a diagram illustrating an example of input text.

The input unit 10 receives a set of text. For example, the input unit 10 receives a set of text including text such as illustrated in FIG. 2.

The arithmetic unit 20 includes a learning data generation unit 21 and a second learning unit 22.

Figure 3:
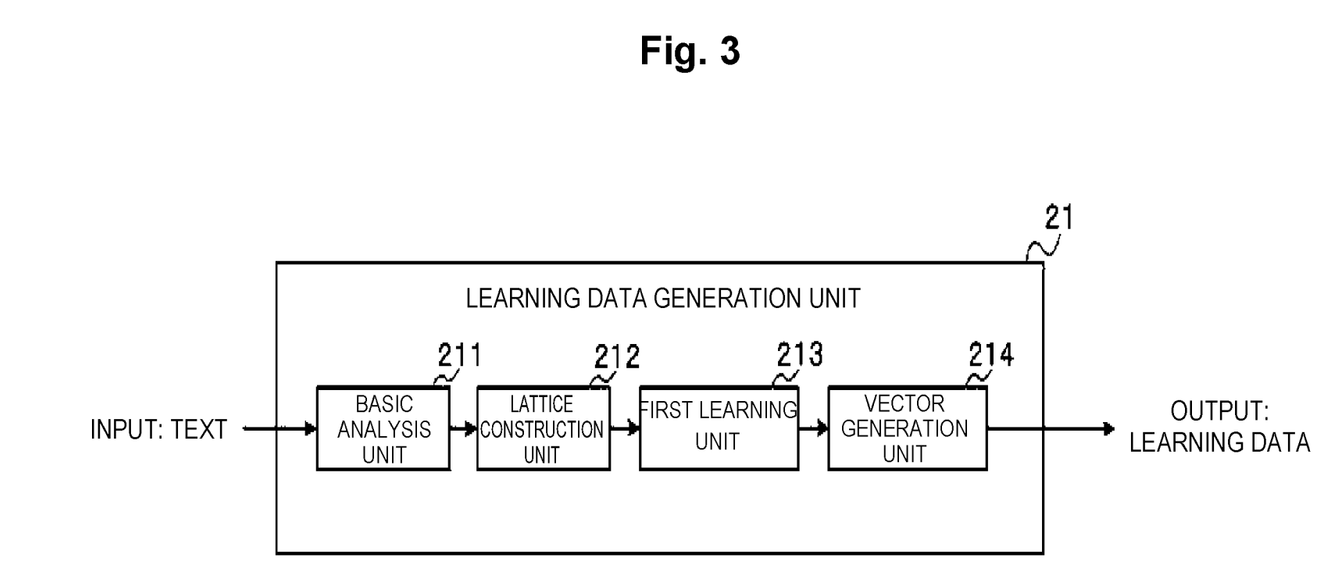
FIG. 3 is a block diagram illustrating a configuration of a learning data generation unit of the phrase vector learning device according to the embodiment of the present invention.

The learning data generation unit 21 includes a basic analysis unit 211, a lattice construction unit 212, a first learning unit 213, and a vector generation unit 214, as illustrated in FIG. 3.

The basic analysis unit 211 performs morphological analysis and dependency analysis on each text.

Figure 4:
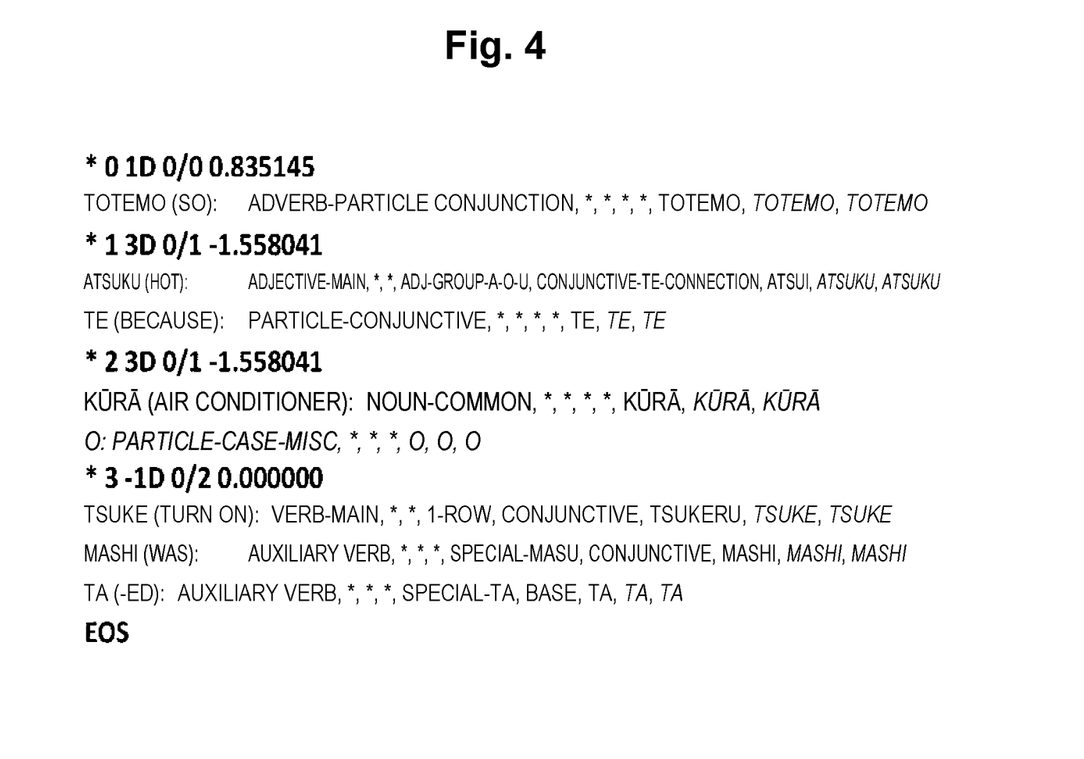
FIG. 4 is a diagram illustrating an example of a result of morphological analysis and dependency analysis.

An example of a result of the morphological analysis and dependency analysis of the text illustrated in FIG. 2 is illustrated in FIG. 4. Any morphological analysis and dependency analysis may be used. For example, CaboCha that is a known morphological analyzer is used (https://taku910.github.io/cabocha/).

Figure 5:
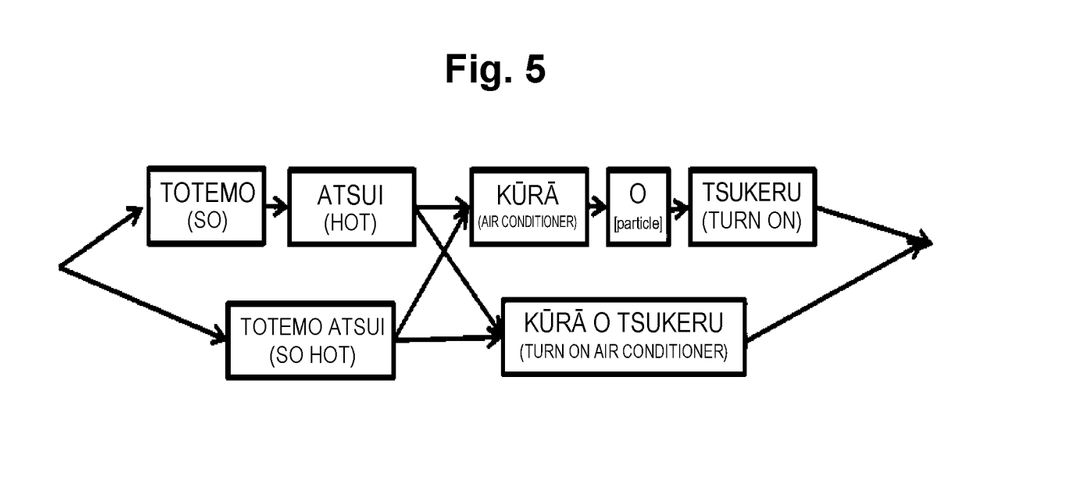
FIG. 5 is a diagram illustrating an example of a lattice structure.

Based on the result of the morphological analysis and the dependency analysis of each text, the lattice construction unit 212 constructs a lattice structure that includes each of phrasable phrase candidates obtained from the text and are formed by links binding adjacent word or phrase candidates in accordance with a sequence of lines of the word or phrase candidates (FIG. 5).

Specifically, N continuing dependency clauses are first connected to set phrase candidates. How many continuing dependency clauses are connected (=N) may be set arbitrarily. In the example of FIG. 5, N=2 is set and a maximum of two clauses (phrases) are connected from one clause to set nodes of lattices. At this time, an infinitive of a verb (in this example, 9th line) may be used (for example, tusuke mashi to (turned on)→tsukeru (turn on)). A lattice structure in which word and phrase candidates are set as nodes of the lattice structure and the nodes are connected at each clause position is constructed.

Figure 6:
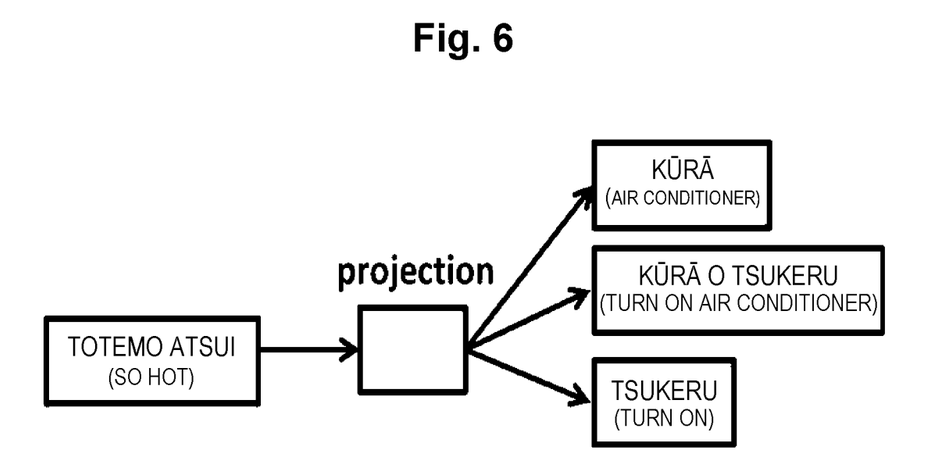
FIG. 6 is a diagram illustrating a neural network A.

The first learning unit 213 performs learning of a neural network A estimating nearby word or phrase candidates from the word or phrase candidates based on the lattice structure constructed for each text (see FIG. 6). Here, the neural network A includes an input layer and an output layer corresponding to each element of a set M of the word or phrase candidates. The nearby word or phrase candidates are word or phrase candidates that fall within a predetermined range earlier than input word or phrase candidates or are word or phrase candidates that fall within a predetermined range later than the input word or phrase candidates.

Specifically, the following is performed. First, with regard to all the lattice structures generated from a set of input text, a set of word or phrases that form the lattice structure is set to M (the number of vocabularies I, i=1, . . . , I, where I is a number given to each vocabulary).

Learning of the neural network A including an input layer and an output layer corresponding to each element $m\_i$ of the set M is performed using a scheme of Reference Literature 1 or the like.

Here, when learning of the neural network A is performed, nearby nodes are estimated in consideration of a plurality of phrase candidates unlike Non-Patent Literature 1. Here, the nearby nodes are a set of nodes that are within a predetermined range before the position of a start character of word or phrase candidates forming the nodes and a set of nodes that are within a predetermined range in a direction of the position of an end character of the word or phrase candidates forming the nodes. Here, the ranges of the nodes and the nearby nodes may be set so that the ranges overlap each other.

The vector generation unit 214 acquires a vector of each of the word or phrase candidates from the learned neural network A and sets the vectors as learning data.

Figure 7:
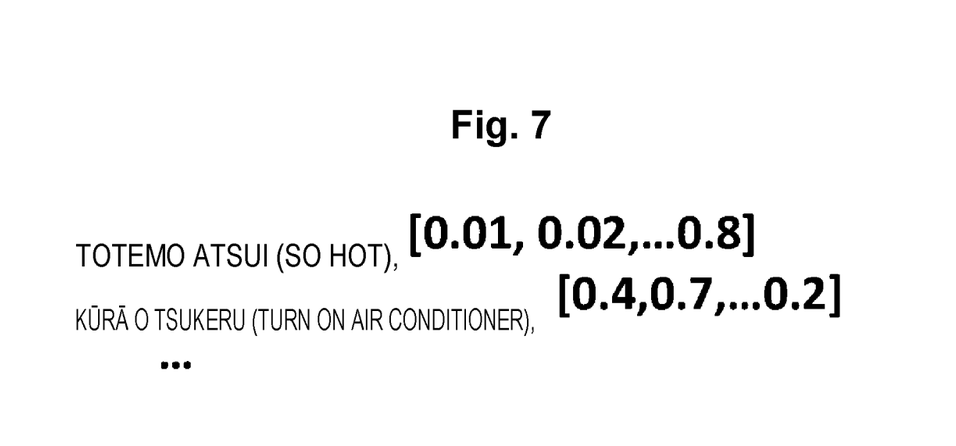
FIG. 7 is a diagram illustrating an example of learning data.

Specifically, a column vector $v\_i$ (Embedding vector) corresponding to each element $m\_i$ of M is extracted from a transformation matrix (Embedding matrix) of the input layer of the learned neural network A, $m\_i$ and $v\_i$ are paired, and a set of the vectors is output as learning data (see FIG. 7). A dimension of $v\_i$ is d dimensions and d is any natural number.

Figure 8:
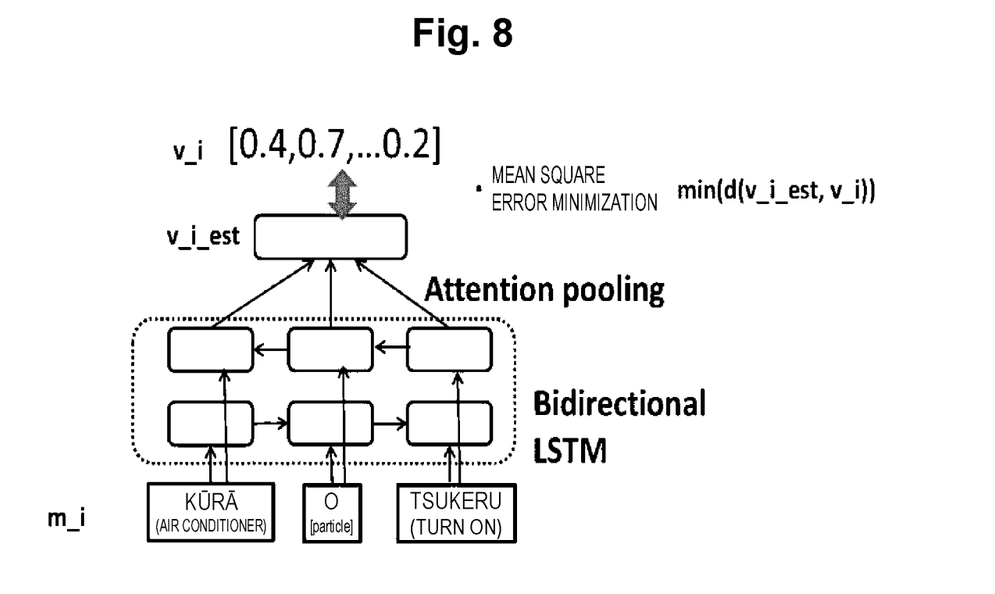
FIG. 8 is a diagram illustrating a neural network B.

The second learning unit 22 performs learning of the neural network B for vectorizing word or phrase candidates based on the learning data (the set of pairs of $m\_i$ and $v\_i$). Of the learning data, a set of words or phrases forming all $m\_i$ is assumed to be E (the number of vocabularies J, j=1, . . . , J).

The neural network B is configured using, for example, a bidirectional LSTM. When the phrase candidates are vectorized, each word included in the phrase candidates is set as an input. The input layer corresponds to each element e_j of E. The output layer has the d dimension that is the same as v_i of the learning data and v_i_est in which a vector of an input word or phrase m_i is estimated is output.

A learning method may be a general method such as mean square error minimization. The input m_i is partitioned into words, the partitioned words are input to the neural network B, and learning of the neural network B is performed so that v_i_est to be output restores the vector v_i (see FIG. 8).

<Configuration of Phrase Vector Estimation Device According to Embodiment of the Present Invention>

Figure 9:
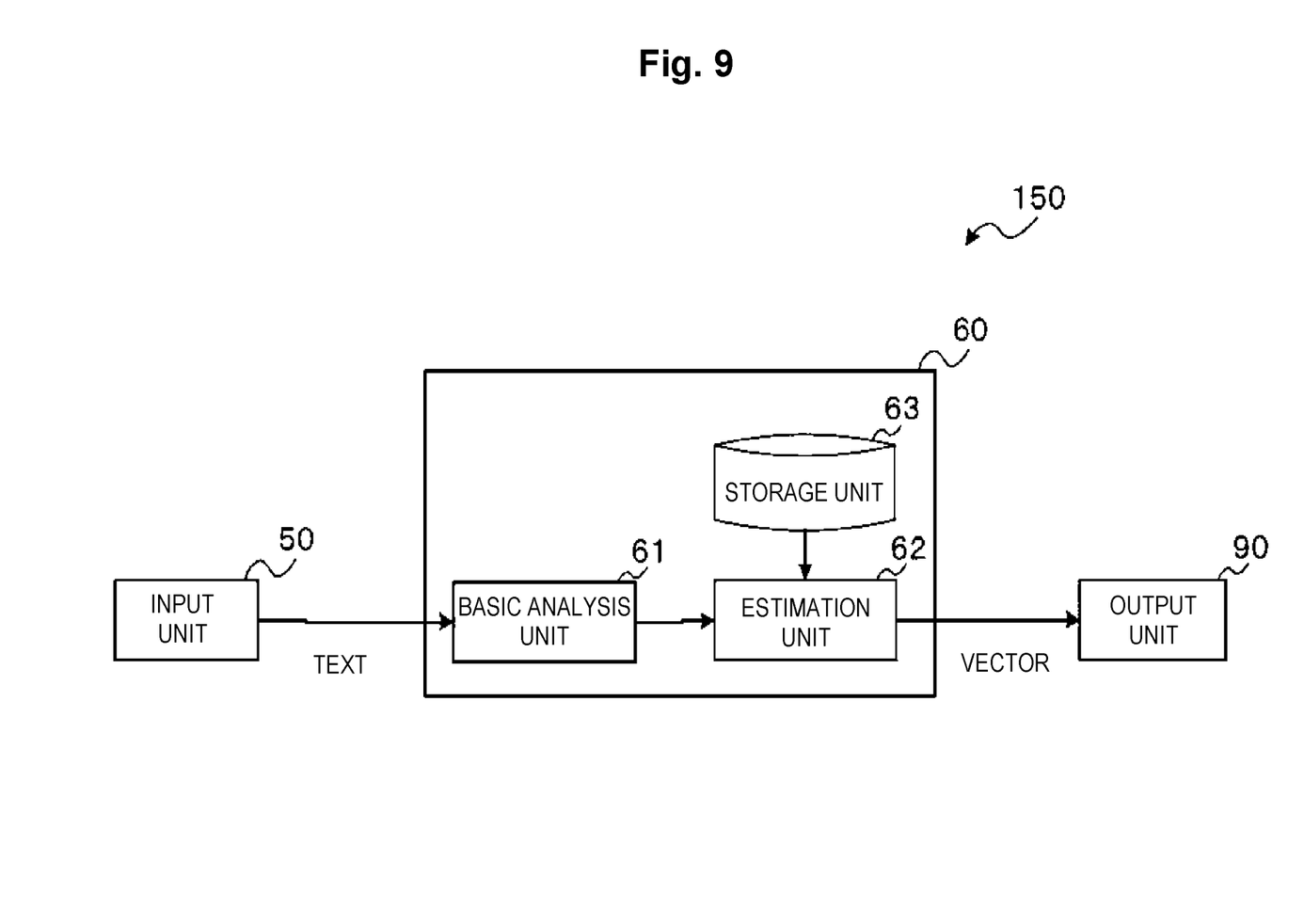
FIG. 9 is a block diagram illustrating a configuration of the phrase vector estimation device according to the embodiment of the present invention.

Next, a configuration of a phrase vector estimation device according to the embodiment of the present invention will be described. As illustrated in FIG. 9, a phrase vector estimation device 150 according to the embodiment of the present invention can be configured as a computer including a CPU, a RAM, and a ROM that stores a program executing a phrase vector estimation process routine to be described below and various kinds of data. The phrase vector estimation device 150 functionally includes an input unit 50, an arithmetic unit 60, and an output unit 90, as illustrated in FIG. 9.

The input unit 50 receives a phrase (text).

The arithmetic unit 60 includes a basic analysis unit 61, an estimation unit 62, and a storage unit 63.

The storage unit 63 stores a model for the neural network B subjected to learning by the phrase vector learning device 100.

The basic analysis unit 61 performs morphological analysis on the input text and partitions the text into words.

The estimation unit 62 inputs each word of the input text using the model for the neural network B stored in the storage unit 63, estimates a vector of the text, and outputs the estimated vector to the output unit 90.

For example, as illustrated in FIG. 8, each word of the input text is input to each encoding unit included in the bidirectional LSTM and an estimation result of the vector is output from the output of the bidirectional LSTM through an attention pooling layer.

<Operation and Effect of Phrase Vector Learning Device According to Embodiment of the Present Invention>

Next, an operation and effect of the phrase vector learning device 100 according to the embodiment of the present invention will be described. When the input unit 50 receives the set of the text, the phrase vector learning device 100 performs a learning data generation process routine illustrated in FIG. 10.

Figure 10:
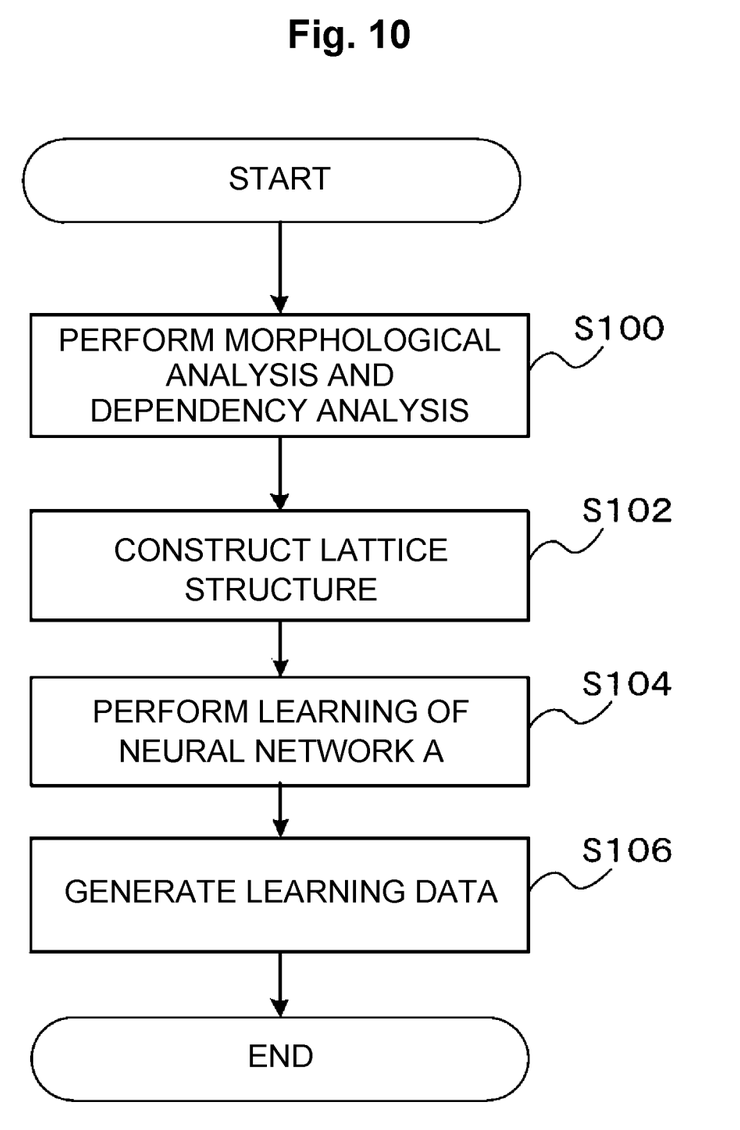
FIG. 10 is a flowchart illustrating a learning data generation process routine in the phrase vector learning device according to the embodiment of the present invention.

In step S100, the morphological analysis and the dependency analysis are first performed on each text.

In step S102, the lattice structure is constructed for each text based on the analysis result of step S100.

In step S104, learning of the neural network A for estimating the nearby word or phrase candidates from the word or phrase candidates is performed based on the lattice structure constructed for each text in step S102.

In step S106, the vector for each of the word or phrase candidates is acquired from the learned neural network A and is set as learning data.

Figure 11:
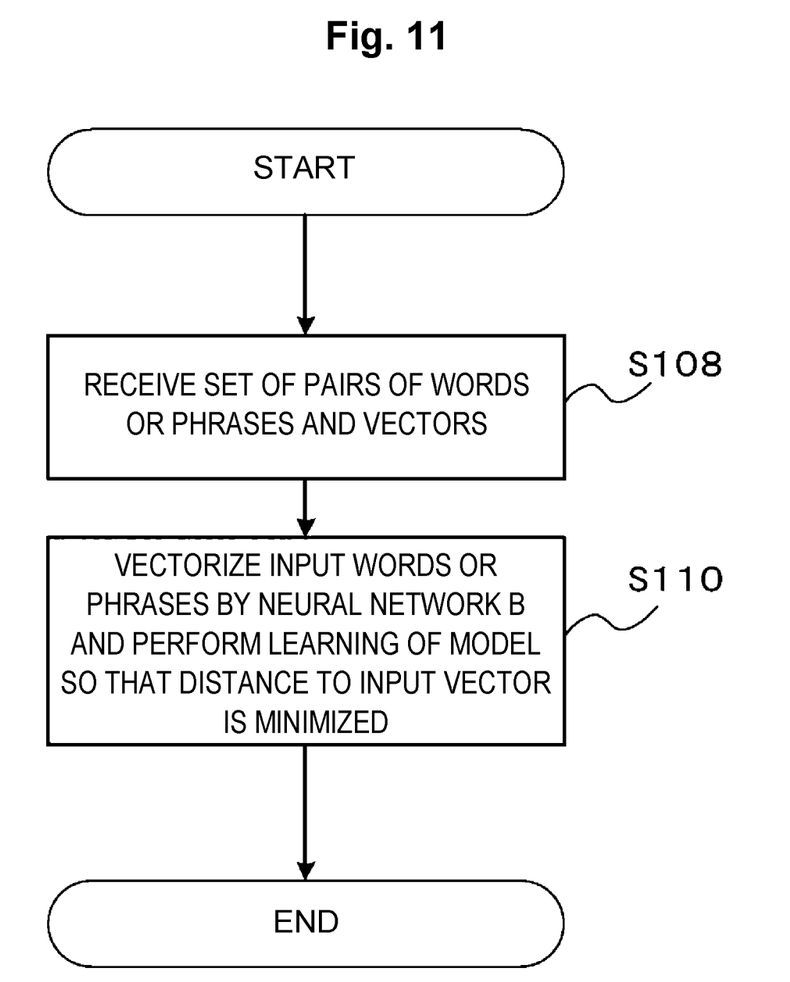
FIG. 11 is a flowchart illustrating a phrase vector learning process routine in the phrase vector learning device according to the embodiment of the present invention.

Then, the phrase vector learning device 100 performs the phrase vector learning process routine illustrated in FIG. 11.

In step S108, a set of the pairs of word or phrase candidates and the vectors are received as the learning data.

In step S110, learning of the neural network B for vectorizing the word or phrase candidates is performed based on set of the pairs of word or phrase candidates and the vectors.

<Operation and Effect of Phrase Vector Estimation Device According to Embodiment of the Present Invention>

Next, an operation and effect of the phrase vector estimation device 150 according to the embodiment of the present invention will be described. When the model for the neural network B previously subjected to learning by the phrase vector learning device 100 is input to the phrase vector estimation device 150, the phrase vector estimation device 150 stores the model for the neural network B in the storage unit 63. When the input unit 50 receives text that is a phrase, the phrase vector estimation device 150 performs a phrase vector estimation process routine illustrated in FIG. 12.

Figure 12:
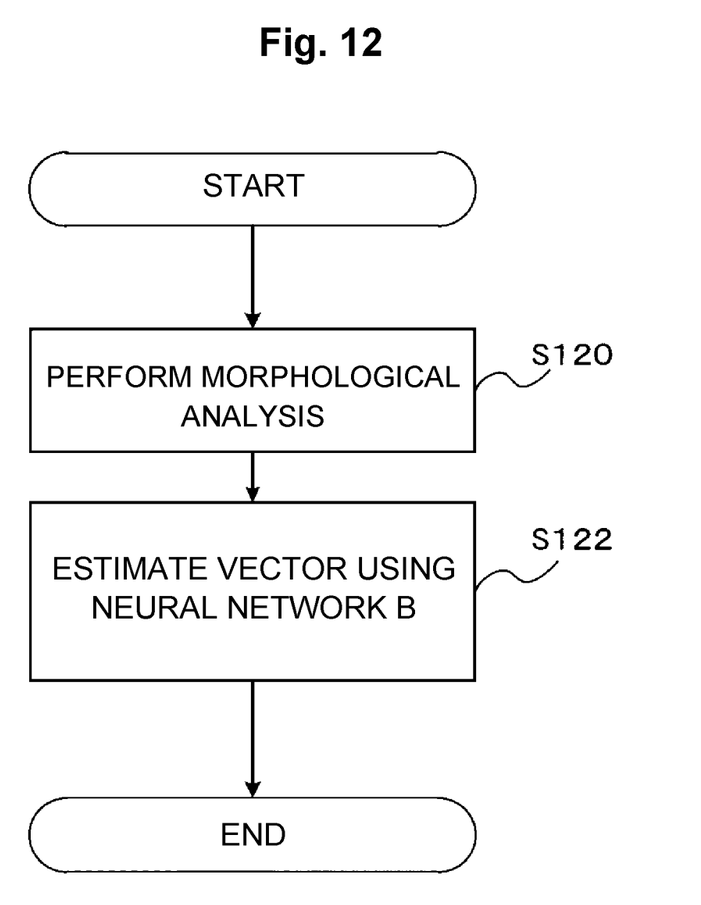
FIG. 12 is a flowchart illustrating a phrase vector estimation process routine in a phrase vector estimation device according to the embodiment of the present invention.

In step S120, the morphological analysis is performed on the text received by the input unit 50 to partition the text into words.

In step S122, each word of the input text is input using the model for the neural network B stored in the storage unit 63, the vector of the text is estimated, the vector is output by the output unit 90, and the phrase vector estimation process routine ends.

As described above, the phrase vector learning device according to the embodiment of the present invention performs learning of the neural network A for estimating the nearby word or phrase candidates based on the lattice structure formed by the links binding the adjacent word or phrase candidates, acquires the vector of each of the word or phrase candidates from the neural network A, and performs learning of the neural network B for vectorizing the word or phrase candidates using the vector as the learning data. In this way, it is possible to generate an appropriate vector for any phrase.

By obtaining a vector representation of the words or phrases while simultaneously considering many phrased candidates using the result of the dependency analysis, it is possible to obtain the more robust vector representation of the phrase that does not appear in the input corpus or of which the number of appearances is small.

The learning data is generated from the model for the neural network learned once in units of phrases and learning of the model for the neural network capable of vectorizing any phrase is performed. Thus, it is possible to realize a model in which any input can be received without manpower of correct answers and similarity of phrases is appropriately reflected.

The phrase vector estimation device according to the embodiment of the present invention can generate an appropriate vector of any phrase.

The present invention is not limited to the above-described embodiment and various modifications or applications can be made within the scope of the present invention without departing from the gist of the present invention.

For example, in the above-described embodiment, the case in which the phrase vector estimation device 150 and the phrase vector learning device 100 are configured as different devices has been described as an example. However, the phrase vector estimation device 150 and the phrase vector learning device 100 may be configured as one device.

The above-described phrase vector learning device and phrase vector estimation device have an internal computer system, but the "computer system" is assumed to include a website providing environment (or display environment) when the WWW system is used.

REFERENCE SIGNS LIST

10 Input unit
20 Arithmetic unit
21 Learning data generation unit
22 Second learning unit
40 Output unit
50 Input unit
60 Arithmetic unit
61 Basic analysis unit
62 Estimation unit
63 Storage unit
90 Output unit
100 Phrase vector learning device
150 Phrase vector estimation device
211 Basic analysis unit
212 Lattice construction unit
213 First learning unit
214 Vector generation unit

The invention claimed is:

1. A computer-implemented method for machine learning of a text, the method comprising:
receiving a text;
generating, based on the received text, a lattice structure, the lattice structure comprising one or more links connecting adjacent candidates in a sequence of lines of the candidates based on results from a morphological analysis and a dependency analysis of words of the received text, each of the candidates including one or more words, wherein the lattice structure includes each of clauses in the received text as nodes connected by a link connecting adjacent candidates in accordance with the sequence of lines of the candidates;
generating the candidates by connecting dependency clauses of the received text up to a predefined maximum number of dependency clauses to connect;
generating nodes of the lattice structure, each node representing one of the candidates, and the nodes are distinct;
generating links of the lattice structure, each of the links connecting two of the nodes; and
training, based on the generated lattice structure, a first neural network for estimating additional candidates in proximity from the candidates.

2. The computer-implemented method of claim 1, wherein the first neural network includes an input layer and an output layer, and the method further comprising:
extracting a vector corresponding to each word of the candidates based on a transformation matrix in the input layer of the first neural network; and
generating a vector of each of the candidates based on the extracted vector.

3. The computer-implemented method of claim 1, generating, using the first neural network, a set of vectors corresponding to one or more of the candidates as learning data for a second neural network; and
training, based on the learning data, the second neural network for generating vectors of the candidates.

4. The computer-implemented method of claim 3, wherein the second neural network is based on a bidirectional long short-term memory (LSTM), and wherein the generating vectors of the candidates using the second neural network is based on a plurality of words in phrases forming the candidates as an input.

5. The computer-implemented method of claim 1, wherein the first neural network estimates one or more candidates in proximity of a candidate input based on the lattice structure.

6. The computer-implemented method of claim 5, wherein the one or more candidates in proximity of the candidate input includes a first candidate within a first predetermined range of words preceding the candidate input and a second candidate within a second predetermined range of words proceeding the candidate input.

7. A system for machine learning of a text, the system comprising:
a processor; and
a memory storing computer-executable instructions that when executed by the processor cause the system to:
receive a text;
generate, based on the received text, a lattice structure, the lattice structure comprising one or more links connecting adjacent candidates in a sequence of lines of the candidates based on results from a morphological analysis and a dependency analysis of words of the received text, each of the candidates including one or more words, wherein the lattice structure includes each of clauses in the received text as nodes connected by a link connecting adjacent candidates in accordance with the sequence of lines of the candidates;
generate the candidates by connecting dependency clauses of the received text up to a predefined maximum number of dependency clauses to connect;
generate nodes of the lattice structure, each node representing one of the candidates, and the nodes are distinct;
generate links of the lattice structure, each of the links connecting two of the nodes; and
train, based on the generated lattice structure, a first neural network for estimating additional candidates in proximity from the candidates.

8. The system of claim 7, wherein the first neural network includes an input layer and an output layer, and the computer-executable instructions when executed further causing the system to:
extract a vector corresponding to each word of the candidates based on a transformation matrix in the input layer of the first neural network; and
generate a vector of each of the candidates based on the extracted vector.

9. The system of claim 7, the computer-executable instructions when executed further causing the system to:
generate, using the first neural network, a set of vectors corresponding to one or more of the candidates as learning data for a second neural network; and
train, based on the learning data, the second neural network for generating vectors of the candidates.

10. The system of claim 9, wherein the second neural network is based on a bidirectional long short-term memory (LSTM), and wherein the generating vectors of the candidates using the second neural network is based on a plurality of words in phrases forming the candidates as an input.

11. The system of claim 7, wherein the first neural network estimates one or more candidates in proximity of a candidate input based on the lattice structure.

12. The system of claim 11, wherein the one or more candidates in proximity of the candidate input includes a first candidate within a first predetermined range of words preceding the candidate input and a second candidate within a second predetermined range of words proceeding the candidate input.

13. A computer-readable non-transitory recording medium storing computer-executable instructions that when executed by a processor cause a computer system to:
    receive a text;
    generate, based on the received text, a lattice structure, the lattice structure comprising one or more links connecting adjacent candidates in a sequence of lines of the candidates based on results from a morphological analysis and a dependency analysis of words of the received text, each of the candidates including one or more words, wherein the lattice structure includes each of clauses in the received text as nodes connected by a link connecting adjacent candidates in accordance with the sequence of lines of the candidates;
    generate the candidates by connecting dependency clauses of the received text up to a predefined maximum number of dependency clauses to connect;
    generate nodes of the lattice structure, each node representing one of the candidates, and the nodes are distinct;
    generate links of the lattice structure, each of the links connecting two of the nodes; and
    train, based on the generated lattice structure, a first neural network for estimating additional candidates in proximity from the candidates.

14. The computer-readable non-transitory recording medium of claim 13, wherein the first neural network includes an input layer and an output layer, and the computer-executable instructions when executed further causing the computer system to:
    extract a vector corresponding to each word of the candidates based on a transformation matrix in the input layer of the first neural network; and
    generate a vector of each of the candidates based on the extracted vector.

15. The computer-readable non-transitory recording medium of claim 13, the computer-executable instructions when executed further causing the computer system to:
    generate, using the first neural network, a set of vectors corresponding to one or more of the candidates as learning data for a second neural network; and
    train, based on the learning data, the second neural network for generating vectors of the candidates.

16. The computer-readable non-transitory recording medium of claim 15, wherein the second neural network is based on a bidirectional long short-term memory (LSTM), and wherein the generating vectors of the candidates using the second neural network is based on a plurality of words in phrases forming the candidates as an input.

17. The computer-readable non-transitory recording medium of claim 13, rein the first neural network estimates one or more candidates in proximity of a candidate input based on the lattice structure, and wherein the one or more candidates in proximity of the candidate input includes a first candidate within a first predetermined range of words preceding the candidate input and a second candidate within a second predetermined range of words proceeding the candidate input.

* * * * *